United States Patent
Chen et al.

(10) Patent No.: US 9,154,075 B2
(45) Date of Patent: Oct. 6, 2015

(54) SOLAR CELL MODULE EFFICACY MONITORING SYSTEM AND MONITORING METHOD THEREFOR

(71) Applicant: TOKYO ELECTRON LIMITED, Minato-ku (JP)

(72) Inventors: Jin-Syung Chen, Hsin-chu (TW); Pei-Chin Lin, Hsin-chu (TW); Osamu Nishimaniwa, Tsukuba (JP); Katsushi Suzuki, Tsukuba (JP); Lai-Pheng Gan, Hsin-chu (TW); Jui-Kang Chiang, Hsin-chu (TW); Chin-Yin Lee, Hsin-chu (TW)

(73) Assignee: UKC ELECTRONICS (H.K.) CO., LIMITED, Kowloon (HK)

( * ) Notice: Subject to any disclaimer, the term of this patent is extended or adjusted under 35 U.S.C. 154(b) by 0 days.

(21) Appl. No.: 14/484,705

(22) Filed: Sep. 12, 2014

(65) Prior Publication Data

US 2014/0375343 A1 Dec. 25, 2014

Related U.S. Application Data

(63) Continuation-in-part of application No. PCT/JP2013/001689, filed on Mar. 14, 2013.

(30) Foreign Application Priority Data

Mar. 14, 2012 (JP) .................. 2012-056758

(51) Int. Cl.
*G01R 31/40* (2014.01)
*G01W 1/14* (2006.01)
(Continued)

(52) U.S. Cl.
CPC ............... *H02S 50/00* (2013.01); *G01K 13/00* (2013.01); *G01P 5/001* (2013.01); *G01W 1/12* (2013.01);
(Continued)

(58) Field of Classification Search
None
See application file for complete search history.

(56) References Cited

U.S. PATENT DOCUMENTS 6,093,884 A * 7/2000 Toyomura et al. ............ 136/244
8,473,250 B2 * 6/2013 Adest et al. ................... 702/182
(Continued)

FOREIGN PATENT DOCUMENTS

JP 2008-300745 A 12/2008
JP 2011-216604 A 10/2011
(Continued)

OTHER PUBLICATIONS

International Search Report issued Jun. 18, 2013 in PCT/JP2013/001689 filed Mar. 14, 2013.

*Primary Examiner* — Jermele M Hollington
(74) *Attorney, Agent, or Firm* — DLA Piper LLP (US)

(57) ABSTRACT

A solar cell module efficacy monitoring system includes a reference module which includes a solar power generation module and is to be maintained in a clean condition, an evaluation module which includes a solar power generation module and is to be covered by dust in an environment, maximum power point tracking devices which track powers of the reference module and the evaluation module and maintain power outputs at maximum points by connected to the reference module and the evaluation module, respectively, and, a PV communication recording device which records power generation results of the reference module and the evaluation module by connected to the reference module and the evaluation module, and a calculation display device which calculates power loss due to accumulation of dust on the evaluation module by connected to the PV communication recording device.

19 Claims, 4 Drawing Sheets (51) Int. Cl.
*G08B 21/18* (2006.01)
*H01L 31/042* (2014.01)
*H02S 50/10* (2014.01)
*G01K 13/00* (2006.01)
*G01P 5/00* (2006.01)
*G01W 1/12* (2006.01)
*H02J 3/38* (2006.01)

(52) U.S. Cl.
CPC ............... *G01W 1/14* (2013.01); *G08B 21/182* (2013.01); *H02S 40/00* (2013.01); *H02S 50/10* (2014.12); *H02J 3/385* (2013.01); *Y02E 10/50* (2013.01)

(56) References Cited

U.S. PATENT DOCUMENTS

| | | | |
|---|---|---|---|
| 2012/0138123 A1* | 6/2012 | Newdoll et al. | 136/246 |
| 2013/0033111 A1* | 2/2013 | Kawamoto et al. | 307/66 |
| 2013/0138259 A1* | 5/2013 | Yokoyama | 702/60 |
| 2015/0088440 A1* | 3/2015 | Chen et al. | 702/60 |

FOREIGN PATENT DOCUMENTS

| | | |
|---|---|---|
| JP | 2011-249790 A | 12/2011 |
| JP | 2012-015412 A | 1/2012 |
| JP | 2012-028435 A | 2/2012 |

* cited by examiner

SOLAR CELL MODULE EFFICACY MONITORING SYSTEM AND MONITORING METHOD THEREFOR

CROSS-REFERENCE TO RELATED APPLICATIONS

The present application is a continuation-in-part of and based on the International Application No. PCT/JP2013/001689, filed Mar. 14, 2013, which is based upon and claims the benefit of priority to Japanese Patent Application No. 2012-056758, filed Mar. 14, 2012. The entire contents of these applications are incorporated herein by reference.

BACKGROUND OF THE INVENTION

1. Field of the Invention

The present invention relates to a solar cell module efficacy monitoring system and a monitoring method therefor.

2. Description of Background Art

In recent years, as earth's resources decrease and eco-consciousness grows, countries are putting efforts on development of alternative energies such as solar energy, wind energy, geothermal energy and hydro-energy, of which power generation using solar light attracts the most attention. Amount of solar energy reaching earth's surface each day is equivalent to about one quarter of world's oil reserves, and solar energy is an inexhaustible natural resource. Solar power generation is clean and has advantages such as that it does not cause environmental pollution, does not involve resource depletion and can be easily incorporated in a building. Further, along with rapid advancement in semiconductor materials in recent years, solar light photoelectric conversion efficiency continues to improve and thus, this also resulted in wide application of solar cell modules (for example, Japanese Patent Laid-Open Publication No. 2012-015412). The entire contents of this publication are incorporated herein by reference.

SUMMARY OF THE INVENTION

According to one aspect of the present invention, a solar cell module efficacy monitoring system includes a reference module which includes a solar power generation module and is to be maintained in a clean condition, an evaluation module which includes a solar power generation module and is to be covered by dust in an environment, maximum power point tracking devices which track powers of the reference module and the evaluation module and maintain power outputs at maximum points by connected to the reference module and the evaluation module, respectively, and, a PV communication recording device which records power generation results of the reference module and the evaluation module by connected to the reference module and the evaluation module, and a calculation display device which calculates power loss due to accumulation of dust on the evaluation module by connected to the PV communication recording device.

According to another aspect of the present invention, a method for monitoring solar cell module efficacy includes obtaining a rated output from a reference module of a solar cell module, obtaining an actual generated power from an evaluation module of the solar cell module, obtaining power loss $\Delta Pd$ due to accumulation of dust on the evaluation module, obtaining power loss $\Delta Pt$ due to operation temperature of the solar cell module, obtaining power loss $\Delta Pm$ due to maximum power point tracking of the solar cell module, and calculating power loss $\Delta p$ of the solar cell module during actual operation from a formula, $\Delta p$=the rated output of the solar cell module—(actual generated power of the solar cell module+$\Delta Pd$+$\Delta Pt$+$\Delta Pm$). The reference module is to be maintained in a clean condition, and the evaluation module is to be covered by dust in an environment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
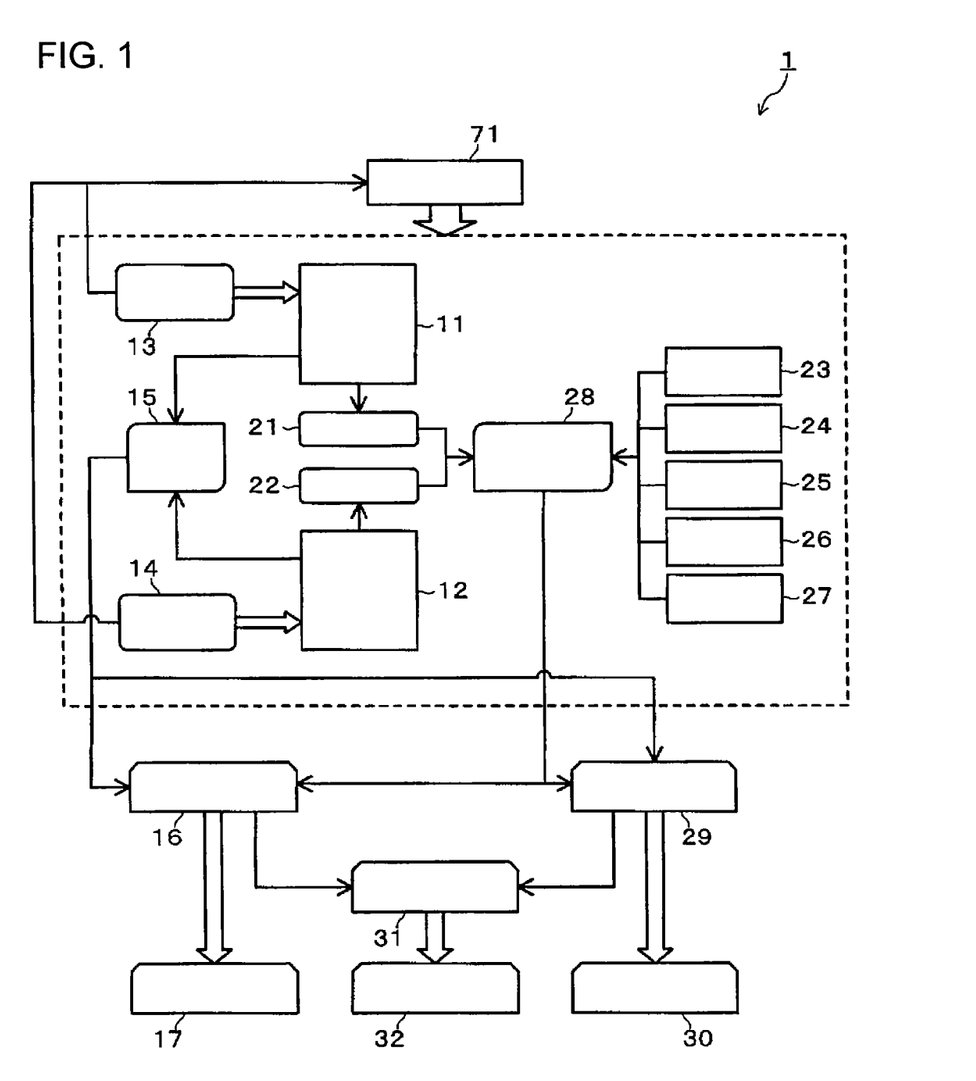
FIG. 1 illustrates a block diagram illustrating a schematic configuration of a main part of a solar cell module efficacy monitoring system 1 according to an embodiment of the present invention.
Figure 2:
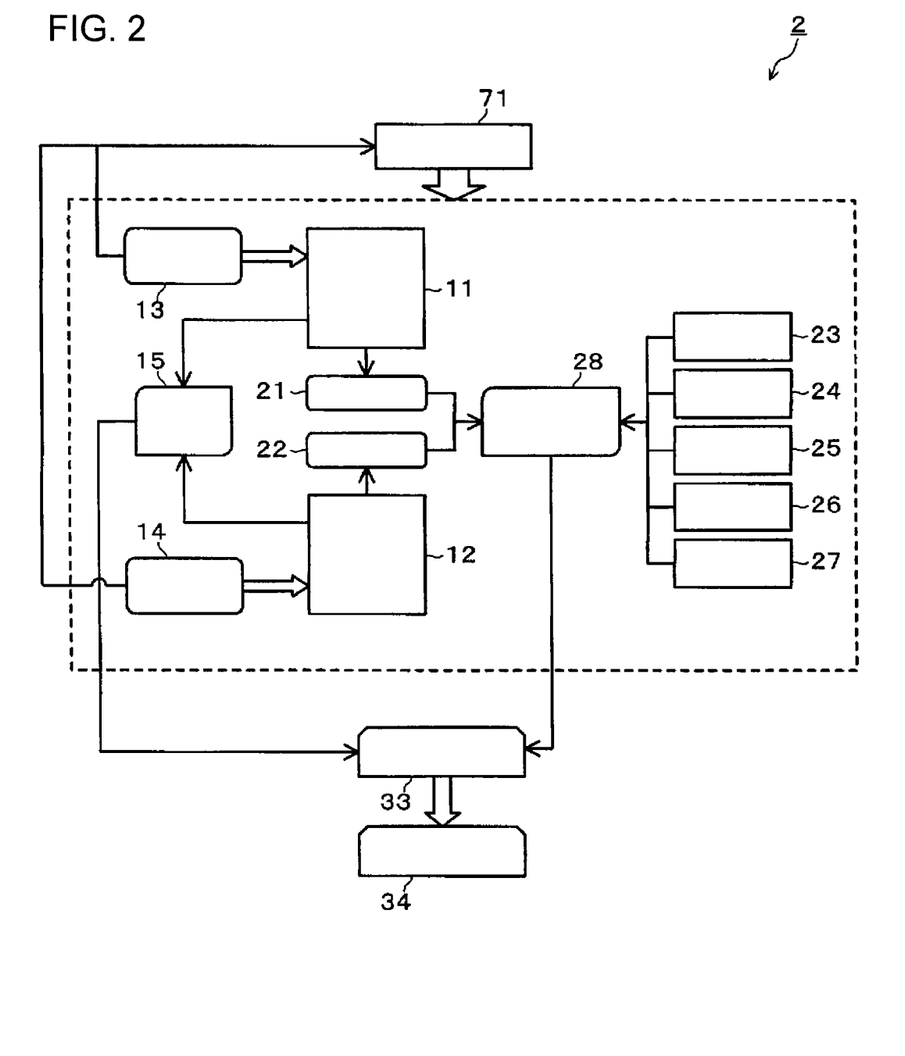
FIG. 2 illustrates a block diagram illustrating a schematic configuration of a main part of a solar cell module efficacy monitoring system 2 according to another embodiment of the present invention.
Figure 3:
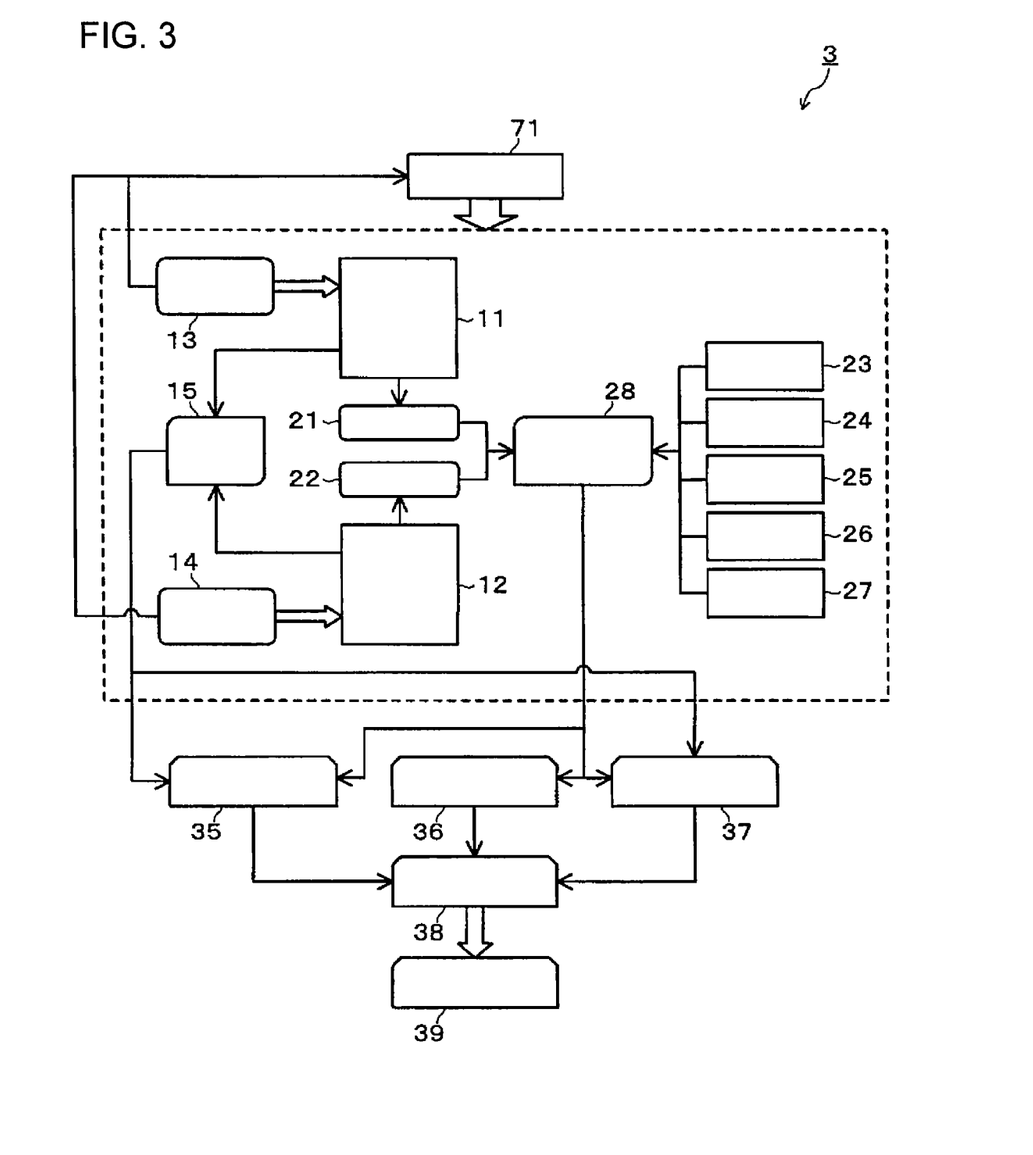
FIG. 3 illustrates a block diagram illustrating a schematic configuration of a main part of a solar cell module efficacy monitoring system 3 according to yet another embodiment of the present invention.
Figure 4:
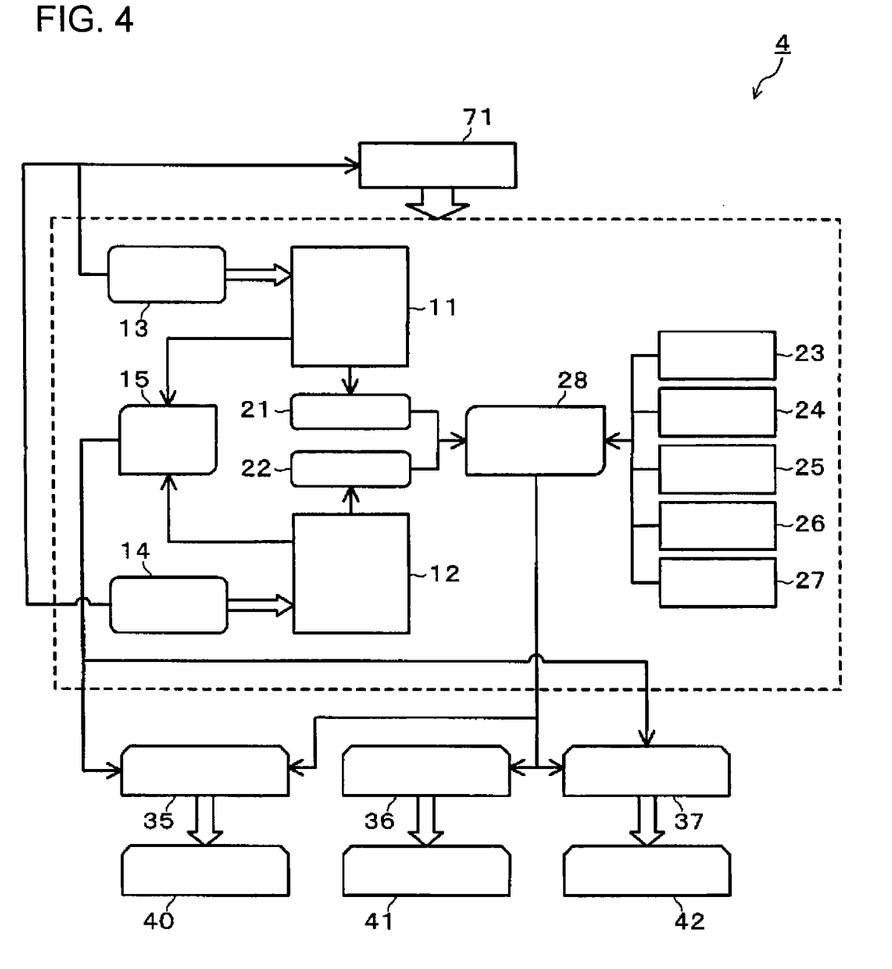
FIG. 4 illustrates a block diagram illustrating a schematic configuration of a main part of a solar cell module efficacy monitoring system 4 according to yet still another embodiment of the present invention.

FIG. 1 illustrates a block diagram of a schematic configuration of a main part of a solar cell module efficacy monitoring system 1 of an embodiment according to the present invention. FIG. 2~4 illustrate block diagrams illustrating schematic configurations of main parts of solar cell module efficacy monitoring systems (2~4) according to other embodiments of the present invention.

A solar cell module efficacy monitoring system 1 according to an embodiment of the present invention is for calculating power generation loss of a solar cell module including power loss due to dust accumulation, power loss due to operating temperature of the solar cell module and power loss due to maximum power point tracking, and for calculating, by making a comparison with a rated output, power loss of the solar cell module during actual operation to timely reflect power generation efficiency and to further issue an alarm and an advice.

With reference to FIG. 1, a solar cell module efficacy monitoring system 1 according to an embodiment of the present invention is described. The solar cell module efficacy monitoring system 1 according to the present embodiment includes: a reference module 11 that is a solar power generation module and a surface of which is constantly maintained in a clean condition; an evaluation module 12 that is a solar power generation module and a surface of which is covered by dust due to factors such as environment and climate; maximum power point tracking devices (13, 14) that, by being respectively connected to the reference module 11 and the evaluation module 12, track maximum power points of the two modules and maintain the two modules in such a manner that the two modules output maximum powers; a PV communication recording device 15 that, by being connected the reference module 11 and the evaluation module 12, reads power values of the two modules using a predetermined clamp meter and records the power values; temperature sensors (21, 22) that, by being respectively connected to the reference module 11 and the evaluation module 12, detect operating temperatures of the two modules; a sensor communication recording device 28 that is connected to a rain gauge 23, a fine particle detector 24, a thermo-hygrometer 25, an anemovane 26 and a solarimeter 27 and is for recording data detected by these sensors, the rain gauge 23 detecting a rainfall value in the environment, the fine particle detector 24 detecting a number of fine particles in the environment, the thermo-hygrometer 25 detecting temperature and humidity in the environment, the anemovane 26 detecting a wind speed and a wind direction in the environment, and the solarimeter 27 detecting a solar radiation value in the environment; a calculation display device 16 that is connected to each of the sensor communication recording device 28 and the PV communication recording device 15 and, based on data received from the sensor communication recording device 28 and the PV communication recording device 15, calculates power loss of the evaluation module 12 due to dust accumulation; a calculation display device 29 that is connected to each of the sensor communication recording device 28 and the PV communication recording device 15 and, based on data received from the sensor communication recording device 28 and the PV communication recording device 15, calculates power loss due to the operating temperature of the evaluation module 12 and power loss due to the maximum power point tracking; a calculation display device 31 that is connected to each of the calculation display device 16 and the calculation display device 29 and, based on relevant data such as the power loss due to dust accumulation that is calculated by the calculation display device 16, the power loss due to the operating temperature of the solar cell module and the power loss due to the maximum power point tracking that are calculated by the calculation display device 29, and actual generated power of the evaluation module 12 and a rated output of the reference module 11, calculates power loss of the solar cell module during actual operation; alarm devices (17, 30, 32) that, by being respectively connected to the calculation display devices (16, 29, 31), issue an alarm and an advice when the respective losses that are calculated by the calculation display devices (16, 29, 31) exceed a specific value; and a power supply device 71 that supplies power to the respective parts of the solar cell module efficacy monitoring system 1.

A description is given of how the respective parts of the solar cell module efficacy monitoring system 1 are used to calculate the power loss due to dust accumulation, the power loss due to the operating temperature of the solar cell module, the power loss due to the maximum power point tracking, and the power loss of the solar cell module during actual operation.

For the power loss due to dust accumulation, in the solar cell module efficacy monitoring system 1, the reference module 11 and the evaluation module 12 are used to compare an effect of dust in the environment on the power generation efficiency of the solar cell module.

By being respectively connected to the maximum power point tracking devices (13, 14), the reference module 11 and the evaluation module 12 are maintained in such a manner that the two modules output maximum powers. The reference module 11 and the evaluation module 12 are also respectively connected to the PV communication recording device 15. Power generation data of the reference module 11 and the evaluation module 12 is recorded in the PV communication recording device 15 and thereafter is transmitted to the calculation display device 16 for calculating the power loss due to dust accumulation. The calculation display device 16 calculates differences in power generation (including a power generation amount, power generation efficiency, an integrated power generation amount, and the like) between the evaluation module 12, which is covered by dust, and the reference module 11.

A part of the results (detection results of, for example, temperatures of the modules, rainfall, fine particles, and the like) that are detected by the respective sensors and are recorded by the sensor communication recording device 28 is also transmitted to the calculation display device 16 and is used in the calculation of the power loss due to dust accumulation. A description will be given later of how the detection results of the temperatures of the modules, rainfall, fine particles and the like are used in the calculation of the power loss due to dust accumulation.

Calculation results of the differences in power generation are further transmitted to the alarm device 17. Based on the calculation results of the differences in power generation that are calculated by the calculation display device 16, the alarm device 17 performs monitoring using, for example, an SPC (Statistical Process Control) statistical control method and timely issues an alarm and an advice.

The solar cell module efficacy monitoring system 1 also has a function of calculating and monitoring power loss due to the actual operating temperature of the solar cell module and power loss due to the maximum power point tracking and timely issuing an alarm and an advice.

The detection results of the respective sensors that are recorded by the sensor communication recording device 28 are transmitted to the calculation display device 29. Power generation results of the solar cell module that are recorded by the PV communication recording device 15 are also transmitted to the calculation display device 29.

The calculation display device 29 is capable of calculating and monitoring the power loss due to the actual operating temperature of the solar cell module and the power loss due to the maximum power point tracking. More specifically, by applying calculation methods such as computation, correction, regression, calibration and the like with respect to the received data, the power loss due to the actual operating temperature of the solar cell module in the system and the power loss due to the maximum power point tracking are calculated.

The power loss due to the operating temperature and the power loss due to the maximum power point tracking that are calculated as described above are further transmitted to the alarm device 30. The alarm device 30 performs monitoring using the SPC statistical control method and timely issues an alarm and an advice.

The power loss due to dust accumulation that is calculated by the calculation display device 16, and the power loss due to the operating temperature of the solar cell module and the power loss due to the maximum power point tracking that are calculated by the calculation display device 29, are respectively transmitted to the calculation display device 31. Based on relevant data such as the respective losses, the actual generated power of the evaluation module 12 and the rated output of the reference module 11, the calculation display device 31 calculates the power loss of the solar cell module during actual operation.

The calculated power loss of the solar cell module during actual operation is further transmitted to the alarm device 32.

The alarm device 32 performs monitoring using the SPC statistical process control method and timely issues an alarm and an advice.

In the present embodiment, cleaning devices (not illustrated in the drawings) that maintain surfaces of the reference module 11 and the solarimeter 27 in a clean condition may be respectively connected to the reference module 11 and the solarimeter 27. Further, washing liquid that is used by the cleaning devices can be recycled and re-used. Therefore, an embodiment of the present invention also has an advantage as being water-saving and eco-friendly.

In a solar cell module efficacy monitoring system 1 according to an embodiment of the present invention, transmission of all data between the respective components (including the data transmission from the respective sensors (21~27) to the communication recording devices (15, 28), the data transmission from the communication recording devices (15, 28) to the calculation display devices (16, 29), the data transmission from the calculation display devices (16, 29, 31) to the alarm devices (17, 30, 32), the data transmission from the calculation display devices (16, 29) to the calculation display device 31, and the like) can be performed via wired, wireless or power line connections.

Power supply to the respective parts of the solar cell module efficacy monitoring system 1 may adopt an internal power supply method or an external power supply method. The internal power supply method is that in which power generated by the reference module 11 and the evaluation module 12 is feedback-supplied to the power supply device 71 and is further supplied from the power supply device 71 to the respective parts of the solar cell module efficacy monitoring system 1. The power supply device 71 may also use the external power supply method in which power is externally supplied to the power supply device 71 and is further supplied from the power supply device 71 to the respective parts of the solar cell module efficacy monitoring system 1.

An embodiment of the present invention has been described using FIG. 1. However, the present invention is not limited to the above embodiment.

For example, as illustrated in FIG. 2, it is also possible to have only one calculation display device 33. The power generation data of the reference module 11 and the evaluation module 12 and the detection data of the respective sensors that is recorded by the communication recording device 15 are transmitted from the PV communication recording device 15 to the calculation display device 33. The calculation display device 33 calculates each of the power loss due to dust accumulation, the power loss due to the operating temperature of the solar cell module and the power loss due to the maximum power point tracking and, based on the relevant data such as the respective losses, the actual generated power of the evaluation module 12 and the rated output of the reference module 11, calculates the power loss of the solar cell module during actual operation.

An alarm device 34 may be connected to the calculation display device 33. The alarm device 34 performs monitoring using the SPC statistical control method and timely issues an alarm and an advice.

Or, as illustrated in FIG. 3, it is also possible to have three calculation display devices (35, 36, 37). The power generation data of the reference module 11 and the evaluation module 12 and the detection data of the respective sensors that is recorded by the communication recording device 15 are transmitted from the PV communication recording device 15 to each of the calculation display devices (35, 36, 37). The calculation display devices (35, 36, 37) respectively calculate the power loss due to dust accumulation, the power loss due to the operating temperature of the solar cell module, and the power loss due to the maximum power point tracking. The calculated respective losses are further transmitted to a calculation display device 38. Based on the power loss due to dust accumulation, the power loss due to the operating temperature of the solar cell module and the power loss due to the maximum power point tracking and based on the relevant data such as the actual generated power of the evaluation module 12 and the rated output of the reference module 11, the calculation display device 38 calculates the power loss of the solar cell module during actual operation.

An alarm device 39 may be connected to the calculation display device 38. The alarm device 39 performs monitoring using the SPC statistical process control method and timely issues an alarm and an advice.

The calculation display devices (35, 36, 37) in the above-described embodiment of FIG. 3 for calculating the power loss due to dust accumulation, the power loss due to the operating temperature of the solar cell module and the power loss due to the maximum power point tracking may be respectively connected to different alarm devices (40, 41, 42) as illustrated in FIG. 4. Based on the power loss due to dust accumulation, the power loss due to the operating temperature of the solar cell module and the power loss due to the maximum power point tracking, the alarm devices (40, 41, 42) timely issue an alarm and an advice.

The above-described embodiments of FIG. 1~4 are merely for describing embodiments of the present invention. The number of the calculation display devices and the number of the alarm devices according to the present invention can be arbitrarily combined. The present invention is not limited to the above-described embodiments. A person of average skill in the art of the present invention can conceive various variations within the scope of present invention.

A method for monitoring solar cell module efficacy according to an embodiment of the present invention is described.

With reference to the above-described configuration of the apparatus according to an embodiment of the present invention, calculation methods for the power loss due to dust accumulation, the power loss due to the operating temperature of the solar cell module and the power loss due to the maximum power point tracking are respectively described.

The power loss due to dust accumulation is indicated using $\Delta Pd$; the power loss due to the operating temperature of the solar cell module is indicated using $\Delta Pt$; and the power loss due to the maximum power point tracking is indicated using $\Delta Pm$. The power loss ($\Delta p$) of the solar cell module during actual operation is obtained using the following Formula 1:

$$\text{the power Loss }(\Delta p)\text{ of the solar cell module during actual operation} = \text{the rated output of the solar cell module} - (\text{the actual generated power of the solar cell module} + \Delta Pd + \Delta Pt + \Delta Pm) \quad \text{Formula 1}$$

In Formula 1, the rated output of the solar cell module is the generated power of the solar cell module that is detected based on ASTM E1036 standard when the solar cell module is in a standard test condition (temperature: 25° C.; solar radiation intensity: 1,000 W/m2). In the present invention, a rated output provided by a manufacturer of the solar power generation module is used as the rated output of the solar cell module. The actual generated power of the solar cell module is the power generated in a state in which the evaluation module 12 is actually used, that is, in a state in which the surface of the evaluation module 12 is covered by dust.

The power loss $\Delta Pd$ due to dust accumulation is obtained using a calculation method in which the generated power of the evaluation module 12 is subtracted from the generated power of the reference module 11.

In order to judge whether or not the surface is really covered by dust (dust accumulation condition) or whether or not the power generation loss is due to system malfunction and other factors, the rain gauge 23 and the fine particle detector 24 are also used. When the amount of the fine particles detected by the fine particle detector 24 is high, the power loss due to dust accumulation should also increase. On the other hand, when the rainfall value detected by the rain gauge 23 is high, since the surface of the solar cell module is washed and becomes clean, the power loss due to dust accumulation should decrease. When a trend different from that described above is observed, it can be inferred that a factor other than dust accumulation has affected the power generation amount and thus it can be judged that it is necessary to perform inspection and verification of the system.

When the surface is covered by dust, the temperature of the solar cell module decreases. Therefore, a difference between temperatures of the reference module 11 and the evaluation module 12 that are respectively detected by the temperature sensors (21, 22) can be used to help judging dust accumulation condition.

Calculation of the power loss ΔPt due to the operating temperature of the solar cell module is described. When the solar cell module receives solar light, the temperature gradually rises. When the temperature of the solar cell module rises, the power generation amount decreases. Therefore, the power loss ΔPt due to the operating temperature of the solar cell module can be calculated from the following Formula 2 by comparing the operating temperature of the evaluation module 12 in an actual operating state and power generation loss in a state of the standard temperature of 25° C.:

$$\Delta Pt = P \times [\{\alpha(T-25)\}/\{1+\alpha(T-25)\}]$$ Formula 2

In Formula 2, P is the generated power of the evaluation module 12 that is recorded by the PV communication recording device 15; a is a temperature coefficient of the solar cell module; and T is the operating temperature of the evaluation module 12 that is detected by the temperature sensor 22.

The operating temperature of the solar cell module is detected by the temperature sensor 22. The temperature sensor 22 may be arranged at any place on a front surface or a back surface of the evaluation module 12. Further, the present invention is not limited to the case of having one temperature sensor 22, but multiple temperature sensors 22 may be provided. When multiple temperature sensors 22 are provided, an average value of operating temperatures that are detected by the multiple temperature sensors is used as the operating temperature of the module.

However, since the temperature sensor 22 is arranged on the front surface or the back surface of the solar cell module, when the temperature sensor 22 is exposed to wind, there is a possibility that a difference occurs between the temperature detected by the temperature sensor 22 and the actual operating temperature of the solar cell module. Further, there is a possibility that temperature and humidity in the environment cause a difference to occur between the temperature detected by the temperature sensor 22 and the actual operating temperature of the solar cell module. Therefore, the thermo-hygrometer 25 and the anemovane 26 can be used to correct the operating temperature of the solar cell module.

A solar energy amount that can be converted by the solar cell module is determined by solar radiation intensity and the temperature of the solar cell module. Since power output of the solar cell module is also different under different operation environment and condition, a maximum power point tracking device has been developed. When the solar radiation intensity varies, the maximum power point tracking device can track the maximum power point of the solar cell module and, even when a part of the solar cell module is blocked, can maximize the power output of the solar cell module.

According to an embodiment of the present invention, the two maximum power point tracking devices (13, 14) are used to track the maximum power points of the reference module 11 and the evaluation module 12 and to maintain the reference module 11 and the evaluation module 12 in such a manner that the two modules can output maximum powers at any time. However, when solar light is momentarily blocked, the power of the solar cell module decreases. However, since, in some cases, the maximum power point tracking device cannot track the maximum power point, the power loss due to the maximum power point tracking occurs. Therefore, another feature of an embodiment of the present invention is that the power loss due to the maximum power point tracking can be calculated.

In an embodiment of the present invention, the power loss ΔPm due to the maximum power point tracking is calculated by comparing the power generation data of the solar cell module and the solar radiation value. More specifically, electric currents and power values of the evaluation module 12 that are recorded by the PV communication recording device 15 and the solar radiation values that are detected by the solarimeter 22 are used to obtain a linear regression relationship between the electric currents and the solar radiation values by performing a regression analysis, which is a statistical technique. Outliers (for example, ±5%) above or below the regression line are removed and, further, a linear regression relationship between the powers and the solar radiation values is obtained. Thereafter, an upper limit and a lower limit (for example, ±10%) are determined from the regression line of the powers and the solar radiation values, and a numeric value that exceeds the upper limit and the lower limit of the regression line is used as the power loss due to the maximum power point tracking.

According to an embodiment of the present invention, a problem can be solved that, when a solar cell module actually operates, whether or not efficacy of the solar cell module has been achieved as in a case of theoretical efficacy cannot be effectively judged.

According to an embodiment of the present invention, the reference module and the evaluation module are used; the power generation data of the solar cell module and data detected by the respective sensors (such as the temperature sensors, the rain gauge, the fine particle detector, the thermo-hygrometer, the anemovane and the solarimeter) are collected; the power generation loss of the solar cell module, including the power loss due to dust accumulation, the power loss due to the operating temperature of the solar cell module and the power loss due to the maximum power point tracking, is calculated; and, by making a comparison with the rated output, the power loss of the solar cell module during actual operation is calculated to timely reflect the power generation efficiency and to further issue an alarm and an advice.

Further, as a feature of an embodiment of the present invention, according to the characteristic calculation method that allows the power loss of the solar cell module during actual operation to be calculated by using the power loss due to dust accumulation, the power loss due to the operating temperature of the solar cell module and the power loss due to the maximum power point tracking and by making a comparison with the rated output, an analysis report information, including operation and maintenance reference information (such as whether or not cleaning is a need; whether or not a material has degraded; and, when the power generation efficiency is lower than expected, whether or not it is necessary to perform maintenance or to replace the solar cell module), can be periodically provided to personnel of a power plant.

A solar cell module efficacy monitoring system and monitoring method therefor according to embodiments of the present invention can be used in a field such as power generation using solar cell modules. Therefore, the present invention has industrial applicability.

Environmental factors have large effects on the power generation efficiency of a solar cell module. For example, factors such climate, season, and day and night affect the solar radiation amount. Further, dirt and dust on a solar cell module cause the power generation amount to decrease. However, it is difficult to determine a relationship between dust accumulation and a decrease in power generation efficiency. Further, power output of a solar cell module is also affected by the temperature of the module when the module is actually used. The higher the temperature of the module is, the lower the power output is. Therefore, a system and a method are needed that allow factors causing decrease in the power generation efficiency of a solar cell module to be clearly identified.

Further, current technologies of solar cell modules have been developed on the premise that the power generation efficiency of the solar cell modules is improved. However, there is no technology for performing evaluation of the power generation efficiency of the solar cell modules. A technical feature of an embodiment of the present invention is that relevant data of a solar cell module during operation is collected using existing sensors and actual operation efficiency of the solar cell module is evaluated using a specific calculation method.

A solar cell module efficacy monitoring system according to an embodiment of the present invention and a monitoring method therefor according to an embodiment of the present invention allow the power generation loss of a solar cell module, including the power loss due to dust accumulation, the power loss due to the operating temperature of the solar cell module and the power loss due to the maximum power point tracking, to be calculated, and allow the power loss of the solar cell module during actual operation to be calculated, by making a comparison with the rated output, to timely reflect the power generation efficiency and to further issue an alarm and an advice.

According to an embodiment of the present invention, a solar cell module efficacy monitoring system provides power generation status of a solar cell module to a user by calculating and monitoring power loss of the solar cell module due to dust accumulation, and includes: a reference module that is a solar power generation module and a surface of which is constantly maintained in a clean condition; an evaluation module that is a solar power generation module and a surface of which is covered by dust in an actual environment; two maximum power point tracking devices that, by being respectively connected to the reference module and the evaluation module, respectively track powers of the two modules and maintain power outputs of the two modules at maximum points; a PV communication recording device that, by being connected to the reference module and the evaluation module, records power generation results of the two modules; and a calculation display device that, by being connected to the PV communication recording device, calculates power loss of the evaluation module due to dust accumulation.

According to another embodiment of the present invention, a solar cell module efficacy monitoring system provides power generation status of a solar cell module to a user by calculating and monitoring power loss due to operating temperature of the solar cell module, and includes: a reference module that is a solar power generation module and a surface of which is constantly maintained in a clean condition; an evaluation module that is a solar power generation module and a surface of which is covered by dust in an actual environment; two maximum power point tracking devices that, by being respectively connected to the reference module and the evaluation module, respectively track powers of the two modules and maintain power outputs of the two modules at maximum points; a sensor communication recording device that includes two temperature sensors and records operating temperatures of the reference module and the evaluation module that are detected by the two temperature sensors; a PV communication recording device that, by being connected to the reference module and the evaluation module, records power generation results of the two modules; and a calculation display device that, by being connected to the sensor communication recording device and the PV communication recording device, calculates power loss due to the operating temperature of the evaluation module.

According to yet another embodiment of the present invention, a solar cell module efficacy monitoring system provides power generation status of a solar cell module to a user by calculating and monitoring power loss of the solar cell module due to maximum power point tracking, and includes: a reference module that is a solar power generation module and a surface of which is constantly maintained in a clean condition; an evaluation module that is a solar power generation module and a surface of which is covered by dust in an actual environment; two maximum power point tracking devices that are respectively connected to the reference module and the evaluation module, respectively track powers of the two modules and maintain power outputs of the two modules at maximum points; a sensor communication recording device that includes a solarimeter and records a solar radiation amount in the environment that is detected by the solarimeter; a PV communication recording device that, by being connected to the reference module and the evaluation module, records power generation results of the two modules; and a calculation display device that, by being connected to the sensor communication recording device and the PV communication recording device, calculates power loss of the evaluation module due to the maximum power point tracking.

According to yet another embodiment of the present invention, a solar cell module efficacy monitoring system provides power generation status of a solar cell module to a user by calculating and monitoring power loss of the solar cell module during actual operation, and includes: a reference module that is a solar power generation module and a surface of which is constantly maintained in a clean condition; an evaluation module that is a solar power generation module and a surface of which is covered by dust in an actual environment; two maximum power point tracking devices that are respectively connected to the reference module and the evaluation module, respectively track powers of the two modules and maintain power outputs of the two modules at maximum points; a PV communication recording device that, by being connected to the reference module and the evaluation module, records power generation results of the two modules; a sensor communication recording device that includes two temperature sensors that detect operating temperatures of the reference module and the evaluation module and a solarimeter and records results that are detected by the sensors; a calculation display device that, by being connected to the sensor communication recording device and the PV communication recording device, calculates each of power loss due to dust accumulation, power loss due to the operating temperature and power loss due to the maximum power point tracking of the evaluation module, and, by making a comparison with a rated output of the reference module, calculates power loss of the evaluation module during actual operation.

According to yet another embodiment of the present invention, power loss ($\Delta p$) of a solar cell module during actual operation is calculated from the following Formula 1: power loss ($\Delta p$) of the solar cell module during actual operation=rated output of a solar cell module−(actual generated power of the solar cell module+$\Delta Pd$+$\Delta Pt$+$\Delta Pm$) . . . Formula 1, where the rated output of a solar cell module is a rated output of a solar cell module (reference module) of which a surface is maintained in a clean condition; the actual generated power of the solar cell module is power generated by a solar cell module (evaluation module) of which a surface is covered by dust; $\Delta Pd$ is power loss due to dust accumulation; $\Delta Pt$ is power loss due to operating temperature; and $\Delta Pm$ is power loss due to maximum power point tracking.

In a solar cell module efficacy monitoring system according to an embodiment of the present invention and a monitoring method therefor according to an embodiment of the present invention, the power generation loss of a solar cell module, including the power loss due to dust accumulation, the power loss due to the operating temperature of the solar cell module and the power loss due to the maximum power point tracking can be calculated, and, by making a comparison with the rated output, the power loss of the solar cell module during actual operation can be calculated to timely reflect the power generation efficiency and to further issue an alarm and an advice. A solar cell module efficacy monitoring system according to an embodiment of the present invention and a monitoring method therefor according to an embodiment of the present invention may be mounted on an inverter, or a part of a configuration thereof may be an inverter. Further, the dust in an embodiment of the present invention includes various factors that cause power loss and that occur on a surface of a solar cell module, such as sand, pollen, fallen leaves and bird droppings.

Obviously, numerous modifications and variations of the present invention are possible in light of the above teachings. It is therefore to be understood that within the scope of the appended claims, the invention may be practiced otherwise than as specifically described herein.

What is claimed is:

1. A solar cell module efficacy monitoring system, comprising:
   a reference module comprising a solar power generation module and configured to be maintained in a clean condition;
   an evaluation module comprising a solar power generation module and configured to be covered by dust in an environment;
   a plurality of maximum power point tracking devices configured to track powers of the reference module and the evaluation module and maintain power outputs at maximum points by connected to the reference module and the evaluation module, respectively;
   a PV communication recording device configured to record power generation results of the reference module and the evaluation module by connected to the reference module and the evaluation module; and
   a calculation display device configured to calculate power loss due to accumulation of dust on the evaluation module by connected to the PV communication recording device.

2. A solar cell module efficacy monitoring system according to claim 1, further comprising:
   a rainfall gauge configured to measure rainfall,
   wherein the calculation display device is configured to apply the rainfall to calculation of the power loss due to accumulation of the dust.

3. A solar cell module efficacy monitoring system according to claim 1, further comprising:
   a fine particle detector configured to detect an amount of fine particles,
   wherein the calculation display device is configured to apply the amount of fine particles to calculation of the power loss due to accumulation of the dust.

4. A solar cell module efficacy monitoring system according to claim 1, further comprising:
   a sensor communication recording device comprising a plurality of temperature sensors and configured to record operating temperature of the reference module and operating temperature of the evaluation module detected by the temperature sensors,
   wherein the sensor communication recording device is configured to be connected to the calculation display device.

5. A solar cell module efficacy monitoring system according to claim 4, wherein the sensor communication recording device includes a thermo-hygrometer configured to measure temperature and humidity and is configured to calibrate the operating temperature of the reference module and the operating temperature of the evaluation module based on the temperature and humidity measured by the thermo-hygrometer.

6. A solar cell module efficacy monitoring system according to claim 4, wherein the sensor communication recording device includes an anemovane configured to measure wind speed and wind direction, and the calculation display device is configured to apply the wind speed and wind direction measured by the anemovane to correct the power loss based on the operating temperature of the reference module and the operating temperature of the evaluation module.

7. A solar cell module efficacy monitoring system according to claim 1, further comprising:
   a sensor communication recording device comprising a solarimeter configured to measure an amount of solar radiation and configured to record the amount of solar radiation measured by the solarimeter,
   wherein the sensor communication recording device is configured to be connected to the calculation display device.

8. A solar cell module efficacy monitoring system according to claim 1, further comprising:
   a sensor communication recording device comprising a plurality of temperature sensors and configured to record operating temperature of the reference module and operating temperature of the evaluation module detected by the temperature sensors,
   wherein the calculation display device is connected to the sensor communication recording device and the PV communication recording device and is configured to calculate the power loss due to accumulation of the dust, power loss due to operating temperature and power loss due to maximum power point tracking and calculate power loss of the evaluation module during actual operation by comparison with a rated output of the reference module.

9. A solar cell module efficacy monitoring system according to claim 8, wherein the calculation display device is provided in a plurality.

10. A solar cell module efficacy monitoring system according to claim 1, further comprising:

an alarm device configured to issue alarm and advice timely when the power loss calculated by the calculation display device exceeds a predetermined value.

11. A solar cell module efficacy monitoring system according to claim 1, wherein the reference module, the evaluation module, the plurality of maximum power point tracking devices, the PV communication recording device and the calculation display device are configured to transmit data one another through one of wire transmission, wireless transmission and power line transmission.

12. A solar cell module efficacy monitoring system according to claim 1, further comprising:
 a cleaning device connected to the reference module and configured to clean the reference module.

13. A solar cell module efficacy monitoring system according to claim 12, wherein the cleaning device is configured to recycle and reuse washing liquid.

14. A solar cell module efficacy monitoring system according to claim 1, further comprising:
 a power supply device connected to the reference module and the evaluation module and configured to feedback power generated by the reference module and the evaluation module,
 wherein the power supply device is configure to supply power to the reference module, the evaluation module, the plurality of maximum power point tracking devices, the PV communication recording device and the calculation display device.

15. A solar cell module efficacy monitoring system according to claim 1, further comprising:
 a power supply device connected to an external power source and configured to supply power from the external power source,
 wherein the power supply device is configured to supply power to the reference module, the evaluation module, the plurality of maximum power point tracking devices, the PV communication recording device and the calculation display device.

16. A method for monitoring solar cell module efficacy, comprising:
 obtaining a rated output from a reference module of a solar cell module;
 obtaining an actual generated power from an evaluation module of the solar cell module;
 obtaining power loss $\Delta Pd$ due to accumulation of dust on the evaluation module;
 obtaining power loss $\Delta Pt$ due to operation temperature of the solar cell module;
 obtaining power loss $\Delta Pm$ due to maximum power point tracking of the solar cell module; and
 calculating power loss $\Delta p$ of the solar cell module during actual operation from a formula, $\Delta p$=the rated output of the solar cell module−(actual generated power of the solar cell module+$\Delta Pd$+$\Delta Pt$+$\Delta Pm$),
 wherein the reference module is configured to be maintained in a clean condition, and the evaluation module is configured to be covered by dust in an environment.

17. A method for monitoring solar cell module efficacy according to claim 16, wherein the power loss $\Delta Pd$ due to accumulation of dust is obtained by subtracting power generated by the reference module and power generated by the evaluation module.

18. A method for monitoring solar cell module efficacy according to claim 16, wherein the power loss $\Delta Pt$ due to operation temperature of the solar cell module is calculated by a formula, $\Delta Pt = P \times [\{\alpha(T-25)\}/\{1+\alpha(T-25)\}]$, where P represents power generated by the evaluation module, a represents a temperature coefficient of the solar cell module, and T represents operation temperature of the evaluation module.

19. A method for monitoring solar cell module efficacy according to claim 16, wherein the power loss $\Delta Pm$ due to maximum power point tracking is a numeric value which exceeds an upper limit and a lower limit of a regression line, where the upper limit and the lower limit of the regression line are determined from a regression line of power and solar radiation values by obtaining a linear regression relationship between electric currents and the solar radiation values by performing a regression analysis using electric currents, power and solar radiation values of the evaluation module, and obtaining a linear regression relationship between the power and the solar radiation values.

* * * * *